United States Patent [19]

Baker

[11] Patent Number: 4,890,179
[45] Date of Patent: Dec. 26, 1989

[54] MAGNETIC TAPE BACKUP DEVICE FOR USE WITH A FLOPPY DISK DRIVE

[76] Inventor: James W. Baker, 2500 Sixth Ave. N., Suite 3, Seattle, Wash. 98109

[21] Appl. No.: 273,659

[22] Filed: Nov. 18, 1988

Related U.S. Application Data

[63] Continuation of Ser. No. 19,886, Feb. 27, 1987, abandoned.

[51] Int. Cl.⁴ ............................................. G11B 23/02
[52] U.S. Cl. .................................................... 360/132
[58] Field of Search ................ 360/94, 132, 133, 96.3, 360/93; 242/55.19 A, 198, 199

[56] References Cited

U.S. PATENT DOCUMENTS

| 2,706,637 | 4/1955 | Cain | 360/90 |
| 3,662,123 | 5/1972 | Huber | 360/94 |
| 3,763,330 | 10/1973 | Fulwiler | 179/100.22 |
| 4,169,277 | 9/1979 | Tomoser | 360/94 |
| 4,779,156 | 10/1988 | Ohta | 360/132 |
| 4,796,136 | 1/1989 | Henze et al. | 360/132 |

FOREIGN PATENT DOCUMENTS

| 0069545 | 7/1982 | European Pat. Off. . |
| 0195571 | 3/1986 | European Pat. Off. . |
| 0214820 | 8/1986 | European Pat. Off. . |
| 0228286 | 12/1986 | European Pat. Off. . |
| 2018490 | 3/1979 | United Kingdom . |

*Primary Examiner*—Robert S. Tupper
*Attorney, Agent, or Firm*—Seed and Berry

[57] ABSTRACT

A tape backup device for use in a magnetic disk drive unit of a personal computer. The tape backup device comprises a relatively thin housing to be inserted into the disk drive, a supply of magnetic recording tape outside the disk drive, tape drive means, and data transfer means. In one embodiment, the data transfer means can comprise means for bringing the disk drive read/write head and magnetic recording tape into sufficiently close proximity to magnetically transfer data therebetween. In a second embodiment, the data transfer means can comprise a magnetic circuit between the disk drive head and the magnetic tape. In a third embodiment, the data transfer means can comprise a translator head for reading data from and writing data to the disk drive head, means for bringing the disk drive head and the translator head into sufficiently close proximity to interact directly, a tape head for reading data from and writing data to the magnetic tape, and circuit means connected between the translator head and the tape head for transmitting data from one head to the other head. The magnetic tape can be stored on two tape reels in a reel-to-reel fashion or can be stored on an endless tape reel. Where the magnetic tape is stored in reel-to-reel fashion, the tape backup device can further comprise an autoreversing mechanism for causing the tape to reverse direction when the tape supply on one reel is exhausted. A tape drive means for causing the magnetic tape to move past the data transfer means can comprise means for coupling mechanical energy from the drive mechanism of the disk drive unit or from a separate electric motor contained within the data backup device. The energy from the drive mechanism or electric motor can be transferred by means of an endless loop driving the tape reel.

5 Claims, 12 Drawing Sheets

MAGNETIC TAPE BACKUP DEVICE FOR USE WITH A FLOPPY DISK DRIVE

This application is a continuation of U.S. patent application Ser. No. 019,886, filed Feb. 27, 1987, now abandoned.

TECHNICAL FIELD

The present invention relates to a backup device for use with a computer system, and more particularly, to a tape backup device for interacting with the head of a floppy disk drive to transfer data between a magnetic tape and the floppy disk drive.

BACKGROUND ART

It has long been recognized that an electronic data handling system should have some associated mechanism or method of operation for preserving the data separately from the system itself. In this way, the data are saved in case of a loss of power to, or an internal failure of, the system. In the case of large computer-based systems, data backup is provided by storing copies of the data separately from the system. These copies are updated frequently in order to minimize the effort that would be required to bring the data up to date in case of a failure.

Smaller computer systems, such as personal computers (PCs), can likewise benefit from data backup. Separate magnetic tape input/output devices, for example, are already used for backup purposes. Typically, however, a magnetic tape device is not used for routine input/output operations with a PC, and therefore represents an additional piece of equipment to be maintained with the computer system. Another limitation of conventional magnetic tape backup devices is their incompatibility with tape backup devices manufactured by others and even other tape backup devices of the same model. Thus, as a practical matter, backup data cannot be transferred from one magnetic tape device to another.

The optical disk is another device that is presently being developed, and that could be useful as a backup device. Recording optical disk units, however, presently represent a relatively expensive means of data backup.

Most modern PC systems, on the other hand, have at least one floppy disk drive for use as an input/output device. Floppy disks are generally used for storage of a few programs and/or data for those programs. Their use as a backup device, however, is relatively inefficient because floppy disks have relatively low data storage capability. For example, the two-sided data storage capacity of a 3½-inch floppy disk is 720 kilobytes, whereas the date storage capability of built-in hard disk drives can exceed 40 megabytes. It would require at least 55 floppy disks to record all of the data that can be held on a 40 megabyte hard disk drive.

The present invention is directed toward a magnetic tape backup device that can transmit data with a disk drive head so that a magnetic tape can serve as a backup medium.

DISCLOSURE OF THE INVENTION

It is an object of the present invention to provide a tape backup device that utilizes the disk drive unit already installed on a conventional computer as its primary component, thus making the "add-on" price of the tape backup device relatively low.

It is another object of the present invention to provide a tape backup device that can transmit data between a moving magnetic tape and a disk drive unit.

It is still another object of the present invention to provide a tape backup device containing magnetic tape, the energy required to move the magnetic tape being coupled from a disk drive unit.

It is yet another object of the present invention to provide a tape backup device with an automatic reversing mechanism to change the direction of the tape movement between the reels in a reel-to-reel tape backup device that can transmit data between a moving magnetic tape and a disk drive unit.

It is further object of the present invention to provide a tape backup device that is compatible with virtually any disk drive unit so that stored backup data can be transferred between different computers.

It is a further object of the present invention to provide a tape backup device that has a lockable write-protect mechanism.

In general, the tape backup device of the present invention is intended to transfer data between the read/write head of a magnetic floppy disk drive and a moving magnetic tape. The apparatus comprises a relatively thin housing shaped to be inserted into the slot of the disk drive, a supply of magnetic recording tape positioned outside the disk drive, tape drive means for causing the tape to pass across a data transfer area, and data transfer means for transferring the data between the read/write head and the data transfer area. More specifically, the tape backup device can comprise an integral housing including a thin lip portion adapted for insertion into the magnetic floppy disk drive and a storage portion adapted to store the supply of magnetic tape. The housing has an aperture that aligns with the read/write head of the disk drive when inserted into the disk drive.

BEST MODE FOR CARRYING OUT THE INVENTION

Figure 1:
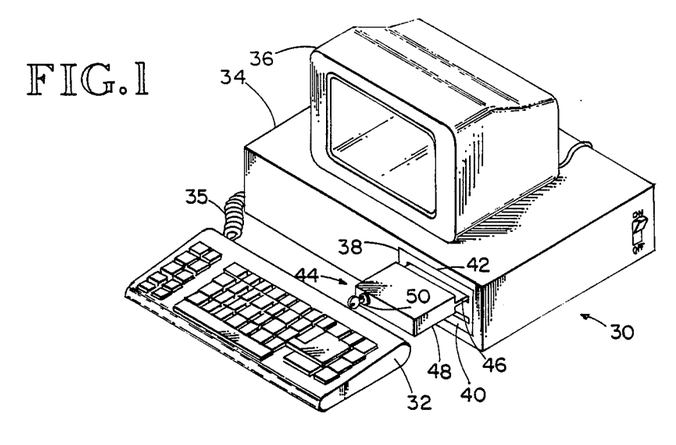
FIG. 1 is an isometric view of a personal computer, showing a tape backup device of the present invention ready for use.

Referring now to FIG. 1, a typical personal computer system 30 includes a keyboard 32 which is connected to a PC housing 34 by a coiled cable 35. Cable 35, in turn, sends signals to a display device 36, such as a monitor. PC housing 34 includes a dual floppy disk drive 38, comprising, for example, two 3½-inch floppy disk drives 40 and 42. One embodiment of the tape backup device 44 is shown inserted into floppy disk unit 42. Tape backup device 44 includes a lip portion 46 that is inserted into the floppy disk drive up to the location of the magnetic read/write head and a storage portion 48 that is supported by the lip portion 46 outside the floppy disk drive. Tape backup device 44 further includes a write-protect lock 50 that can be locked to prevent inadvertent overwriting on the data stored on magnetic tape in tape backup device 44.

Figure 2:
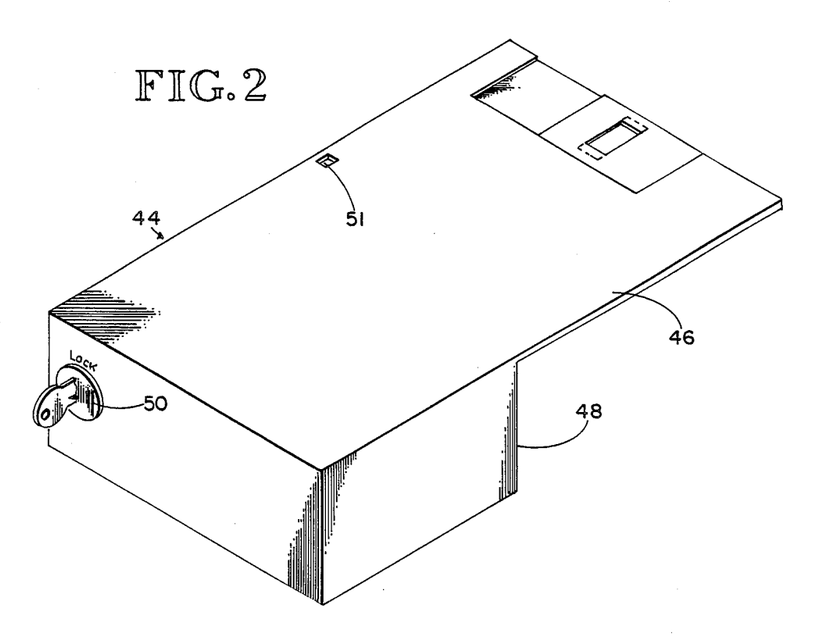
FIG. 2 is an isometric view of the exterior of one embodiment of the tape backup device.

FIG. 2 is an isometric view of the exterior of a 3½-inch tape backup device 44, more clearly showing lip portion 46, storage portion 48, and write/protect lock 50 with write-protect aperture 51. In this embodiment, the upper surface of storage portion 48 can be coplanar with the upper surface of lip portion 46.

Figures 3, 5A:
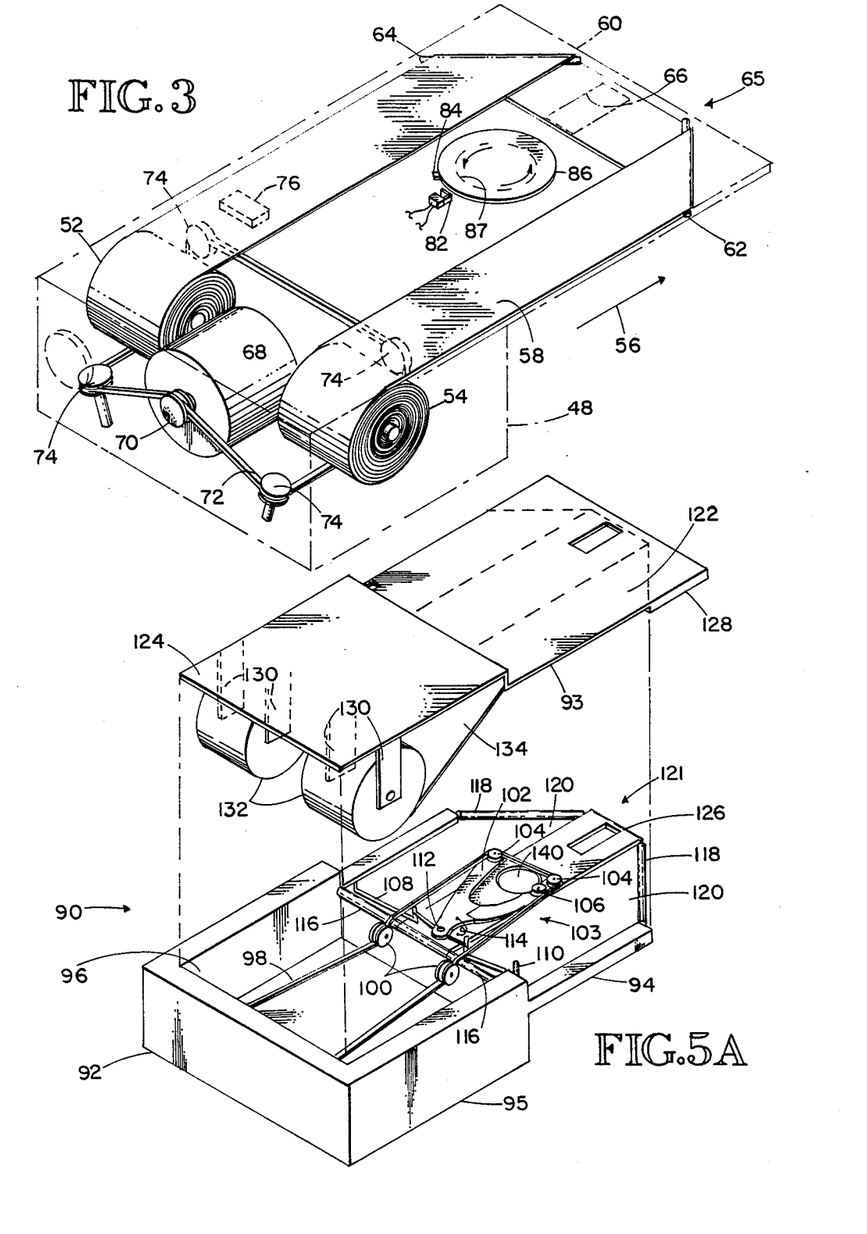
FIG. 3 is an isometric view showing internal components of the tape backup device of FIG. 2.
FIG. 5A is an exploded isometric view of another embodiment of the tape backup device which can reverse the direction of travel of the magnetic tape when the end of the tape is sensed.

FIG. 3 is an isometric view of the tape backup device shown in FIG. 2. Storage portion 48 includes tape reels 52 and 54, which rotate about horizontal axes that are perpendicular to the direction of insertion that is indicated by arrow 56. A single tape loop 58 extends between reels 52 and 54. Tape loop 58 leaves reels 52 and 54 in the direction of insertion (see arrow 56) and lying in the plane of the disk unit slot (normally the horizontal plane). As these two portions of the tape loop reach toward end 60 of lip portion 46, they respectively wrap around tape rollers 62 and 64, which lie in the normally horizontal plane and are inwardly directed toward one another at a 45° angle to the direction of insertion 56. These tape rollers comprises a tape receiving and aligning means 65. Tape loop 58 experiences two 90° turns in lip portion 46, one at each of tape rollers 62 and 64. The portion of tape loop 58 that runs parallel to edge 60 of lip portion 46 passes in close proximity to aperture 66, which is cut in both the upper and lower surfaces of lip portion 46. The lip portion 46 can also include a spring-loaded metal cover (not shown) that slides in the direction of edge 60 to protect the tape within the lip portion. When the tape backup device shown in FIG. 3 is fully inserted into a floppy disk unit, the metal cover (if any) is mechanically moved to expose aperture 66, and aperture 66 is aligned with the read/write head of the floppy disk unit. This allows data to be transferred between the magnetic tape and the read/write head. The overall configuration of lip portion 46 and tape receiving and alignment means 65 comprise an interaction means by which the magnetic tape can interact with the read/write head.

Also contained in storage portion 48 of the tape backup device is a reversible electric motor 68 having a pulley 70 attached to its drive shaft. Pulley 70 drives belt 72, which is forced to follow a path defined by pulleys 74. By the proper positioning of pulleys 74, belt 72 is caused to ride along the lower surface of tape reels 52 and 54, driving them in opposite rotational directions at the same circumferential speed. Near each of the ends of the tape rolled on tape reels 52 and 54 are areas where the reflectivity differs from the reflectivity over the rest of the tape. The change in reflectivity may be caused by a small piece of reflective tape, a piece of colored (e.g., white) tape, or a hole. This change in reflectivity is detected by a conventional optically sensitive switch 76, which generates a signal that causes DC electric motor 68 to change directions under control of computer 30. In this way, the entire supply of tape contained on tape reels 52 and 54 is transferred from one reel to the other and back to the first reel. Each time the reel changes direction, the read/write head from the floppy disk unit is incremented (under control of a computer program to be described later) to cause data to be written on another track on the magnetic tape.

Figure 4:
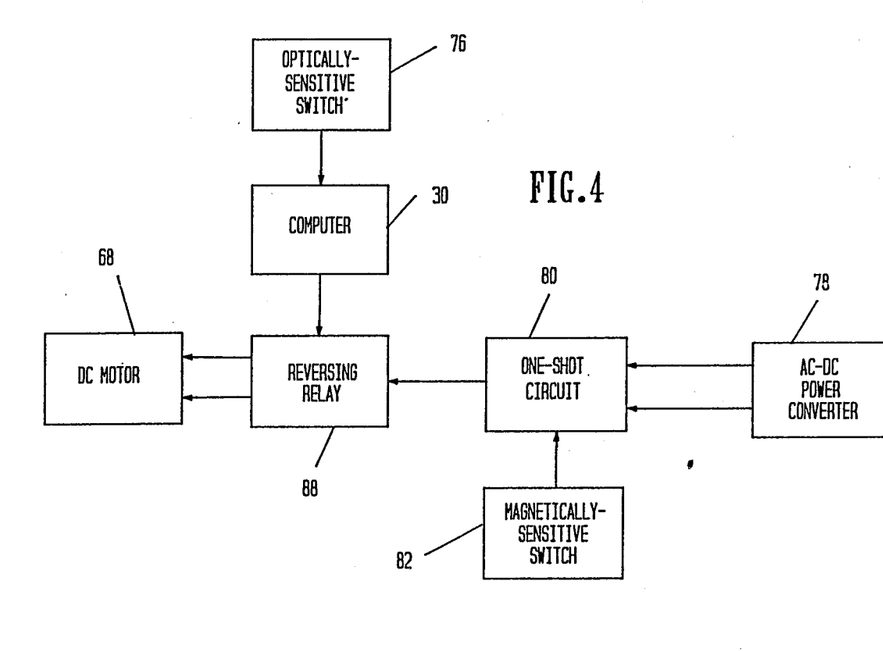
FIG. 4 is a block diagram of the electrical circuitry for supplying electrical power to the DC motor of an embodiment of the tape backup device which can reverse the direction of the magnetic tape when the end of the tape is sensed.

The electrical power supplied to DC motor 68 can be derived from an AC-to-DC power converter which can be plugged into the AC electrical supply systems of the building in which the computer is kept. An embodiment of an electrical circuit that controls the power connections to DC electric motor 68 is shown in block diagram form in FIG. 4. The electrical power from power converter 78 is sent to retriggerable one-shot circuit 80. One-shot circuit 80 also receives a signal from magnetically sensitive switch 82. As shown in FIG. 3, magnetic switch 82 senses the passage of magnet 84, which is attached to driven hub 86. Switch 82 therefore closes momentarily with each rotation of hub 86. Hub 86 can be accessed by the drive mechanism of this drive unit through hole 87 in the lower surface of lip portion 46.

Referring again to FIG. 4, one-shot circuit 80 produces a pulse, lasting approximately one second in duration, with each rotation of driven hub 86. The conventional rotational speed for the drive mechanism of a disk drive unit is five rotations per second. Therefore, the one-shot circuit will produce a constant-voltage signal virtually any time that driven hub 86 is rotating. The signal from circuit 80 is sent to reversing relay 88. Relay 88 is under control of computer 30, which receives a signal from optically sensitive switch 76 (electric connections not shown). Reversing relay 88 connects electrical power of the proper polarity to DC motor 68.

FIG. 5A is an exploded isometric view of another embodiment of the tape backup device. In this embodiment, tape backup device 90 includes two parts, a bottom part 92 and a cover part 93, which together form a lip portion 94 and a storage portion 95. These two parts are formed to interlock together, thereby composing an overall tape backup device that can be inserted into a floppy disk unit such as the 3½-inch floppy disk unit 42 shown in FIG. 1.

Bottom part 92 consists of a cavity 96 that, when assembled, forms part of the storage portion of tape backup device 90. Bottom part 92 also consists of the bottom half of a lip portion of the assembled tape backup device 90. Bottom part 92 contains belt 98, which forms a loop and passes over pulleys 100 within cavity 96. Belt 98 then passes to reversing wishbone 102 of autoreversing mechanism 103, and around pulleys 104. Belt 98 also contacts the circumference of reversing idler 106, which is attached to reversing wishbone 102.

Reversing wishbone 102 also includes wishbone arms 108 and 110, which are intended to receive the magnetic tape of the tape backup device in a manner to be described subsequently. Reversing wishbone 102 can be caused to rotate about wishbone pivot 112 in a normally horizontal plane. The wishbone is biased to one or the other of these two stable positions through a spring 114, which is connected between the wishbone and the outer structure of bottom part 92.

Bottom part 92 also contains tape rollers 116 and 118 to direct the tape loop past the disk drive read/write head. One pair of rollers 116 are located at the juncture of cavity 96 and the bottom part of the lip portion in bottom part 92. Tape rollers 118 are placed along the edge of the bottom part 92 that is directed furthest into the disk drive in order to redirect the tape loop by 90° so that it will pass close to the read/write head of the disk drive unit. Tape rollers 116 and 118 substantially reduce the running friction of the tape. In addition, the lower half of the lip portion formed in bottom part 92 contains grooves 120, which may be coated with a friction-reducing coating such as Teflon ® in order to further reduce running friction of the tape loop. Tape rollers 118 and grooves 120 thus comprise a tape receiving and alignment means 121.

The cover part 93 of tape backup device 90 includes a cover 122 for the lip portion 94 of tape backup device 90 and cover 124 for the storage portion 95 of tape backup device 90. The cover part 93 and bottom part 92 can be snapped together after first inserting leading edge 126 of bottom part 92 into a receiving overlapping part 128 of cover part 93. Then the other end of cover part 93 is snapped into engagement with bottom part 92.

Cover part 93 also includes four tape reel supports 130 which receive and support two tape reels 132 from which tape loop 134 extends.

Figure 5B:
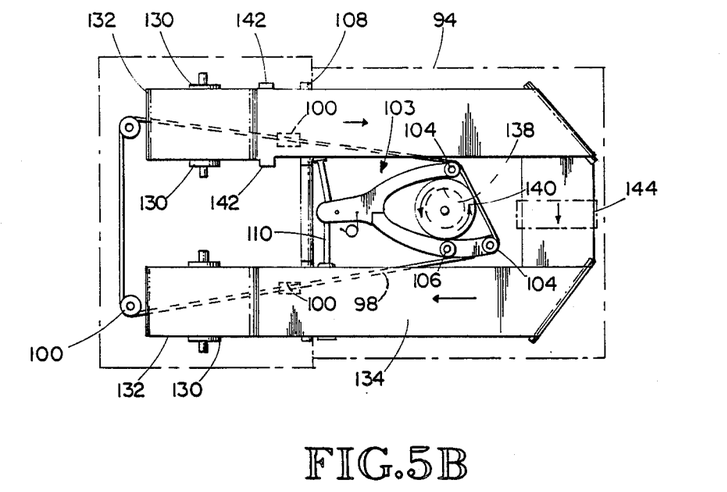
FIG. 5B is a top plan view of the embodiment of the tape backup device shown in FIG. 5A.

FIG. 5B is a top plan view of the tape backup device 90 shown in FIG. 5A. Lip portion 94 has a hole 138 located centrally in its bottom surface. When tape backup device 90 is fully inserted into a floppy disk unit, hole 138 aligns with the driven hub 140 of tape backup device 90. Driven hub 140 is accessed and driven by the driving mechanism of the floppy disk unit through hole 138. Driven hub 140 engages either reversing idler 106 at one point of its circumference or belt 98 at a diametrically opposed point on its circumference, depending on which of the two stable positions the reversing wishbone 102 assumes.

Tape loop 134 rides in wishbone arms 108, 110 when the tape backup device 90 is assembled. Near each of the two ends of the tape, rolled on reels 132, are located tape tabs 142, which extend outwardly from the tape and engage their respective wishbone arms 108, 110.

FIG. 5B shows the reversing mechanism with driven hub 140 engaging reversing idler 106, which, in turn, engages belt 98 and drives it in a clockwise direction. Belt 98 drives against the bottom surfaces of tape reels 132, thereby causing tape loop 134 to also be driven in a clockwise direction. When tape tabs 142 engage wishbone arm 108, wishbone 102 is caused to rotate in a clockwise direction about pivot 112, overcoming the force of spring 114 and causing wishbone 102 to snap clockwise so that belt 98 is brought into direct contact with driven hub 140. This will cause belt 98 to move in a counterclockwise direction and likewise drive tape loop 134 in a clockwise direction. Tape loop 134 will continue moving in a counterclockwise direction until tape tabs 142 in the supply reel strike wishbone arm 110 and cause the wishbone to move to its other stable position. In this way, tape 134 can be caused to move between the reels in the oscillating manner just described.

The read/write head of the floppy disk unit is brought into close proximity with that portion of tape loop 134 which appears through aperture 144 formed in the bottom surface of lip portion 94. The read/write head can then interact with the magnetic coating on tape loop 134 to cause data to be transferred between the disk drive head and the magnetic tape.

Figure 6:
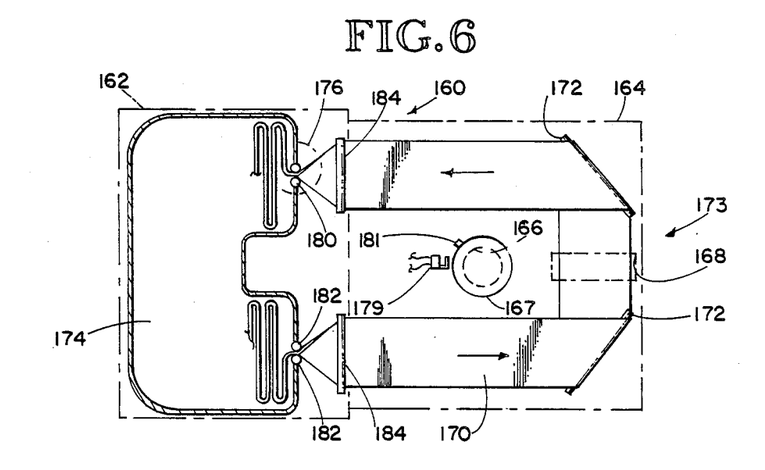
FIG. 6 is a top plan view of an embodiment of the present invention in which the magnetic tape is stored in a stuff bin.

FIG. 6 is a top plan view of another embodiment of the tape backup device of the present invention. Tape backup device 160 comprises storage portion 162 and lip portion 164. Lip portion 164 is inserted into a floppy disk unit and contains hole 166 for receiving the drive mechanism of the disk drive unit to rotate driven hub 167. Lip portion 164 includes aperture 168, through which the disk drive read/write head comes into close proximity with tape loop 170. Tape loop 170 is caused to undergo two 90° turns by tape rollers 172 located in lip portion 164. Tape rollers 172 and aperture 168 comprise a tape receiving and alignment means 173 in lip portion 164.

Storage portion 162 contains a stuff bin 174, which receives the continuous loop of tape 170 after it has passed through lip portion 164. The tape 170 is stored in stuff bin 174 in a serpentine fashion, with the tape being held vertically. The tape is pulled through lip portion 164 in a counterclockwise direction by electric motor 176. Electric motor 176 drives a capstan 178 against a pinch roller 180.

Since the tape moves only in the counterclockwise direction, electric motor 176 need rotate only in a clockwise direction, as seen from above. The electrical power supplied to electric motor 176 can be derived from a power supply connected to the building AC power supply. The electrical power passes through a one-shot circuit which responds to closures of magnetic switch 179 caused by magnet 181, which is attached to the circumference of hub 167. The power from switch 179 passes to a computer-controlled switch (not shown) which, in turn, is connected to electric motor 176.

Since the tape 170 in lip portion 164 runs in a horizontal plane while the tape in stuff bin 174 lies in a vertical plane, tape transition sections are formed in storage portion 162 to give the tape a $\pi°$ twist from horizontal to vertical planes as it enters the stuff bin 174, and from vertical to horizontal planes as it leaves stuff bin 174.

Vertical tape guides 182 and horizontal tape guides 184 cause these two transitions. While it may be most practical to use a magnetic tape that has a coating on only one side, there may be advantages to having the magnetic tape twist at rollers 182 and 184 so that the tape can be in the form of a Mobius strip. This will entail using a magnetic tape that is capable of recording on both sides of the tape, and will double the amount of information the tape can store.

Figure 7:
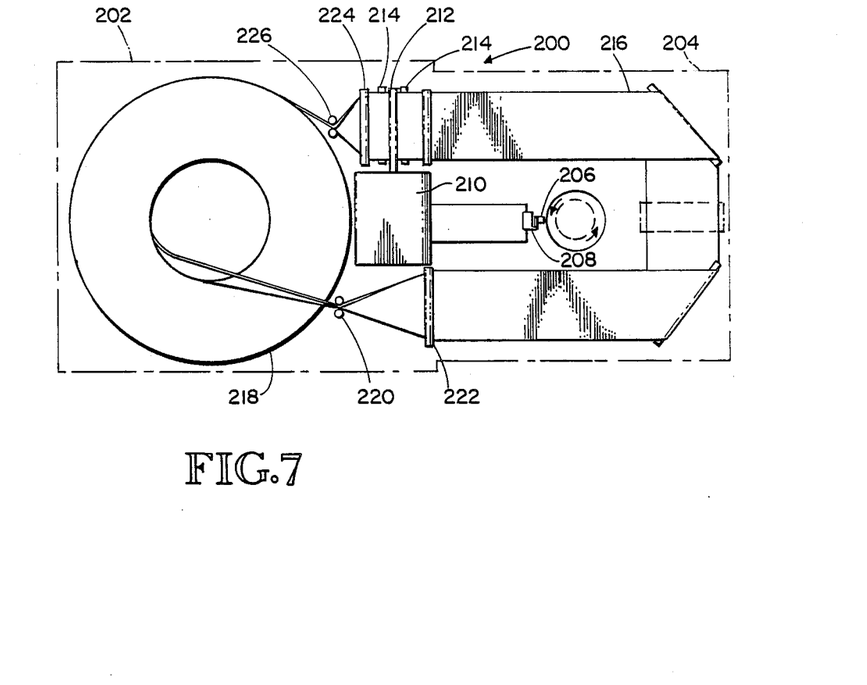
FIG. 7 is a top plan view of an embodiment of the invention in which the magnetic tape supply is an endless loop reel.

FIG. 7 is a top plan view of yet another embodiment of the present invention. In this embodiment, tape backup device 200 comprises storage portion 202 and lip portion 204. While lip portion 204 is very similar to lip portion 164 found in FIG. 6, it further includes a magnet 206 and magnetic switch 208 which serve to detect rotation of the driven hub when lip portion 204 is inserted into the floppy disk unit.

Motor 210 drives a capstan 212 which pinches the magnetic tape against pinch roller 214. The force created in tape loop 216 causes tape to be withdrawn from the inner-most circumference of endless loop tape reel 218. After leaving tape reel 218, the tape passes through vertical roller pair 220 and horizontal roller pair 222 before entering lip portion 204. The force which withdraws tape from tape reel 218 also causes the tape reel to rotate in a counterclockwise direction, thereby pulling magnetic tape through horizontal roller pair 224 and vertical roller pair 226 onto the outermost circumference of tape reel 218.

Figure 8:
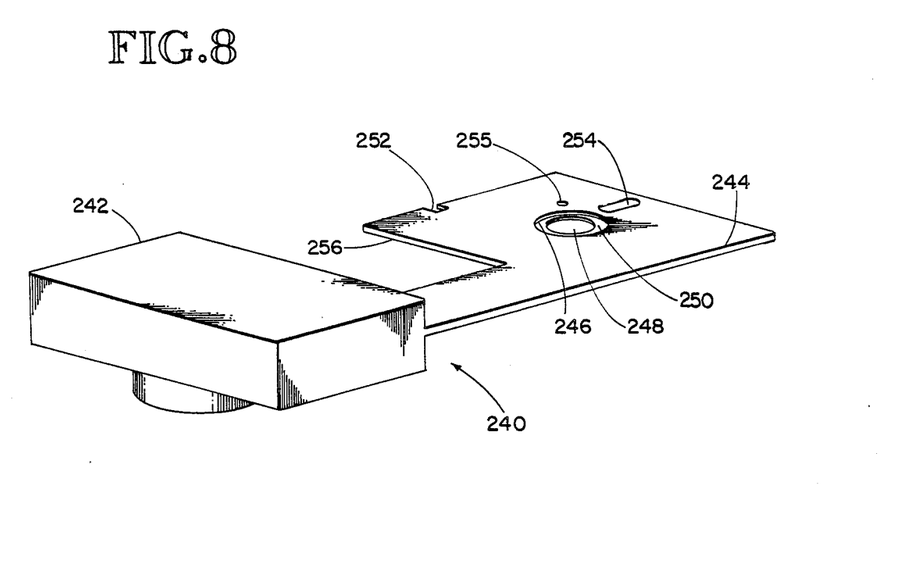
FIG. 8 is an isometric view of the exterior of yet another embodiment of the present invention.

FIG. 8 is an isometric view of the exterior of an alternative embodiment of the present invention. This embodiment is specifically directed toward 5¼-inch (or other) disk drives which cannot be activated until a gate has been closed across the disk drive opening. Tape backup device 240 comprises a storage portion 242 and a lip portion 224. Lip portion 244 has the general configuration of a 5¼-inch floppy disk consisting of a circular hole 246 which exposes a central hole 248 in an inner disk 250. Inner disk 250 will be described in greater detail subsequently. Lip portion 244 further contains a write-protect notch 252 that prevents data from being written on tape backup device 240 unless notch 252 is open. Lip portion 244 also contains an aperture 254 that permits the read/write head of the disk drive unit to come into close proximity with the magnetic tape passing through lip portion 244. Finally, lip portion 244 contains a fixed indexing hole 255.

Tape backup device 240 is shaped to allow edge 256 to be contained within the disk drive unit when the tape backup device is fully inserted into a disk drive. Full insertion eliminates the interference between the gate of the disk drive unit and edge 256, and thus allows the gate to be closed. Closure of the gate enables the disk drive unit to access data from tape backup device 240.

Figure 9:
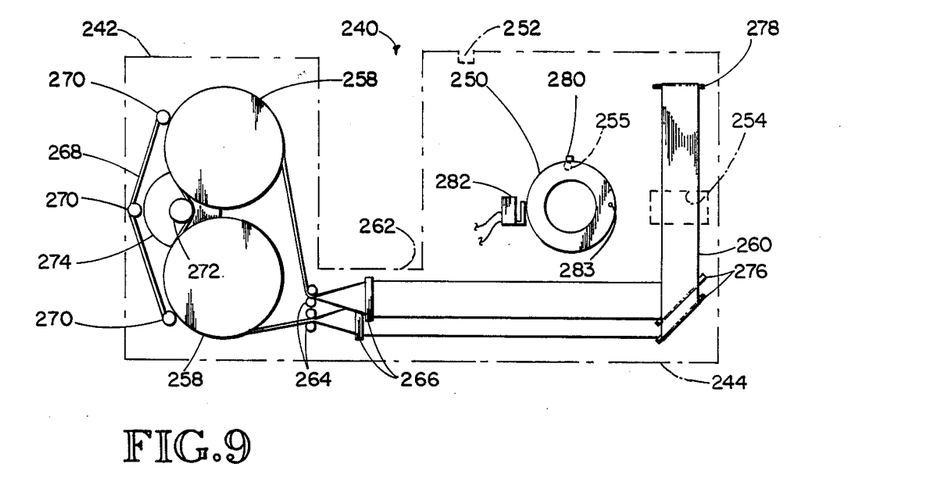
FIG. 9 is a top plan view of the embodiment of the present invention shown in FIG. 8.

FIG. 9 is a top plan view of the tape backup device 240 of FIG. 8. Storage portion 242 contains magnetic tape on two reels, each rotating about a vertical axis. The tape in lip portion 244, by way of contrast, moves in a horizontal plane.

The two tape reels 258 found in storage portion 242 supply tape loop 260 in lip portion 244. In order to cause the transition between the vertically oriented tape in storage portion 242 and the horizontally oriented tape in lip portion 244, storage portion 242 contains a transition section 262 which contains two pairs of vertically oriented rollers 264 and two pairs of horizontally oriented rollers 266. The tape extending between a pair of vertically oriented rollers 264 and a pair of horizontally oriented rollers 266 twists 90°, enabling the desired angular transition of the magnetic tape between the storage and lip portions.

Tape reels 258 are driven by an endless belt 268 that is routed around rollers 270 and drive wheel 272. Drive wheel 272 is driven by electric motor 274. Belt 268 engages a portion of the circumference of both of tape reels 258, rotating them in the same direction. In this way, one of the tape reels 258 acts as a take-up reel while the other acts as a supply reel. Electric motor 274 can rotate in either a clockwise or counterclockwise direction. The direction of rotation is controlled by an autoreverse mechanism similar to autoreverse mechanism 103 of FIG. 4. Power connections to motor 274 can also be completed as described in relation to FIG. 4.

Tape loop 260 in lip portion 244 undergoes two 90° changes of direction around tape rollers 276 and a 180° changes of direction around tape roller 278. In this way, tape loop 260 moves past aperture 254, allowing the read/write head of the disk drive unit to access tape loop 260.

When tape backup device 240 is correctly inserted into a properly operating disk drive unit, the disk drive unit's spindle pulley engages inner disk 250 and causes it to rotate. It is important that motor 272 of the tape backup device 240 causes tape loop 260 to move through lip portion 244 when the spindle pulley is rotating. Spindle pulley rotation is detected by means of a magnet 280 attached to inner disk 250 and a magnetic motor switch 282 that detects rotations of inner disk 250. Motor switch 282 is connected to a conventional circuit that produces a signal indication that the spindle pulley of the disk drive unit is rotating. This signal is transmitted to the host computer system to control the switch between electric motor 274 and the motor power supply. The disk drive unit also contains a protection circuit that detects whether an inserted disk is rotating. The circuit optically detects whether fixed indexing hole 255 aligns with indexing hole 283 in inner disk 250, once per rotation of inner disk 250. If the protection circuit does not detect light pulses sufficiently often, the disk drive unit stops its drive motor.

Figure 10:
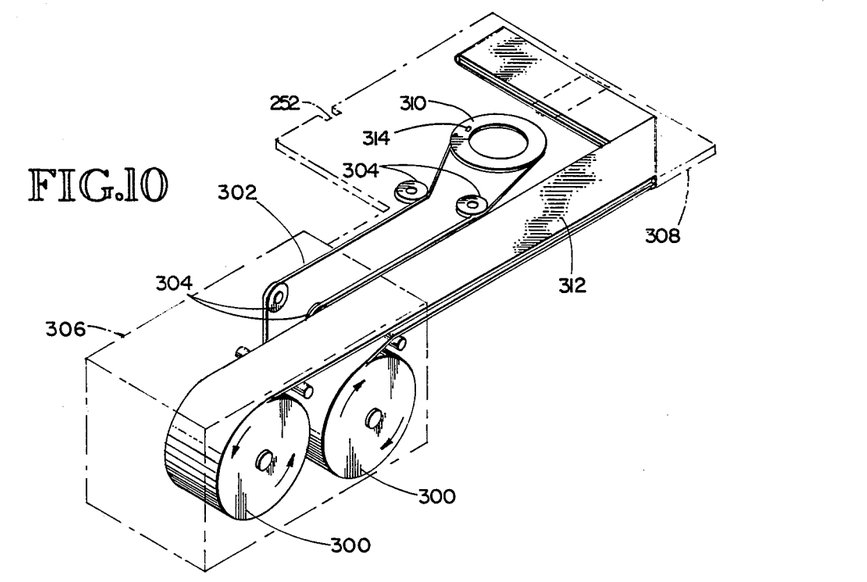
FIG. 10 is an isometric view of still another embodiment of the present invention.

FIG. 10 is an isometric view of another embodiment of a tape backup device for a 5¼-inch floppy disk drive. In this embodiment, the power to drive the supply and take-up reels is coupled from the spindle pulley of the disk drive unit, into which the tape backup device is inserted. In this embodiment, belt 302 rotates tape reels 300 in opposite directions about their horizontal axes. Belt 302 is routed by means of pulleys 304 between tape reels 300 in the storage portion 306 and the lip portion 308. Belt 302 engages an inner pulley 310 which is engaged by the spindle pulley of the disk drive unit. A bistable autoreversing mechanism (not shown) senses when the magnetic tape on the supply reel is about to come to its end, and causes the direction of rotation of tape reels 300 to be changed.

Tape loop 312 follows a path in lip portion 308 that is very similar to the path followed by tape loop 260 in lip portion 244 of FIG. 9. Analogously with the tape backup device of FIG. 9, inner pulley 310 contains a hole 314 that aligns with holes through the outer surfaces of lip portion 308 once per rotation of inner pulley 310. An optical circuit that is part of the disk drive into which the tape backup device of FIG. 10 is inserted determines whether tape loop 312 is moving through lip portion 308.

Figure 11:
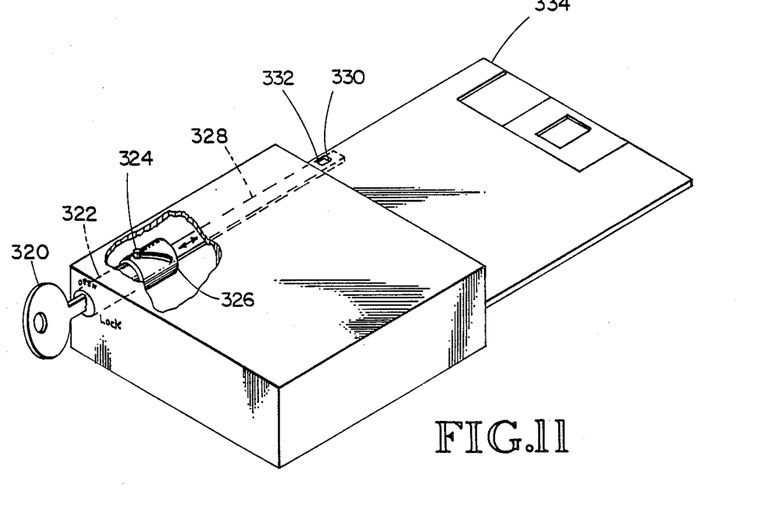
FIG. 11 is a cutaway isometric view of a write-protect lock mechanism for use with various embodiments of the present invention.
Figure 12:
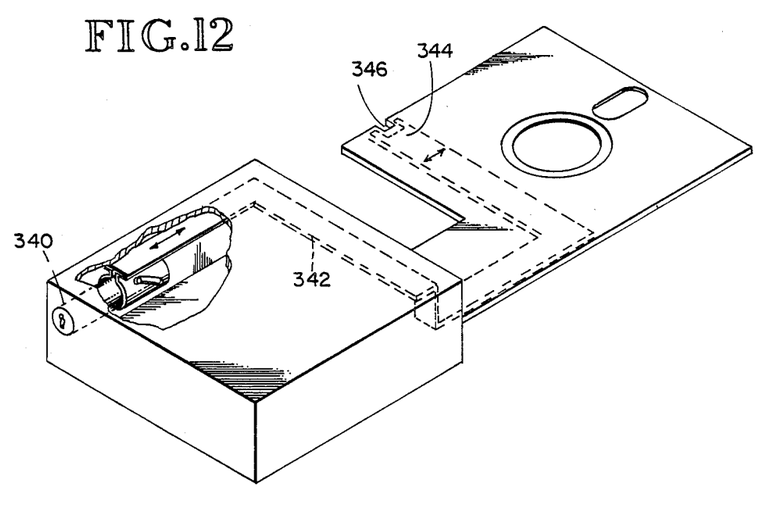
FIG. 12 is a cutaway isometric view of another write-protect lock mechanism for use with still other embodiments of the present invention.

FIGS. 11 and 12 are isometric views of tape backup devices intended for use with 3½-inch and 5¼-inch disk drives, respectively. These tape backup devices have lockable write-protect mechanisms that prevent the data on the magnetic tape in the tape backup devices from being overwritten by the disk drive unit.

In the tape backup device of FIG. 11, turning the key 320 in lock 322 causes pin 324 to move from the vertical position to a horizontal position or vice versa. This in turn causes cylindrical sleeve 326 to move forward and backward in the direction of insertion of the tape backup device. A metal plate 328, attached to sleeve 326 and having an aperture at 330, moves together with the movement of sleeve 326, and causes aperture 330 to be aligned or not aligned with a hole 332 in lip portion 334. An optical sensor in the floppy disk drive detects when aperture 330 aligns with hole 332 and will not permit data to be written to the tape backup device if the hole and aperture are aligned. When key 320 is in its "open" position, the hole and aperture do not align and the disk drive permits data to be written into the tape backup device.

FIG. 12 shows a similar mechanism for a tape backup device for use with a 5¼-inch disk drive. In this tape backup device, turning a key in lock 340 actuates bar 342 back and forth in the direction of insertion of the tape backup device. A shutter 334 moves with bar 342 and aligns with notch 346 in lip portion 348 when lock 340 is in the "lock" position. A disk drive unit into which the tape backup device of FIG. 12 is inserted will therefore detect whether the key is in the "open" or "lock" positions and enable or disable any attempts to write on the tape contained in the tape backup device.

Figure 13:
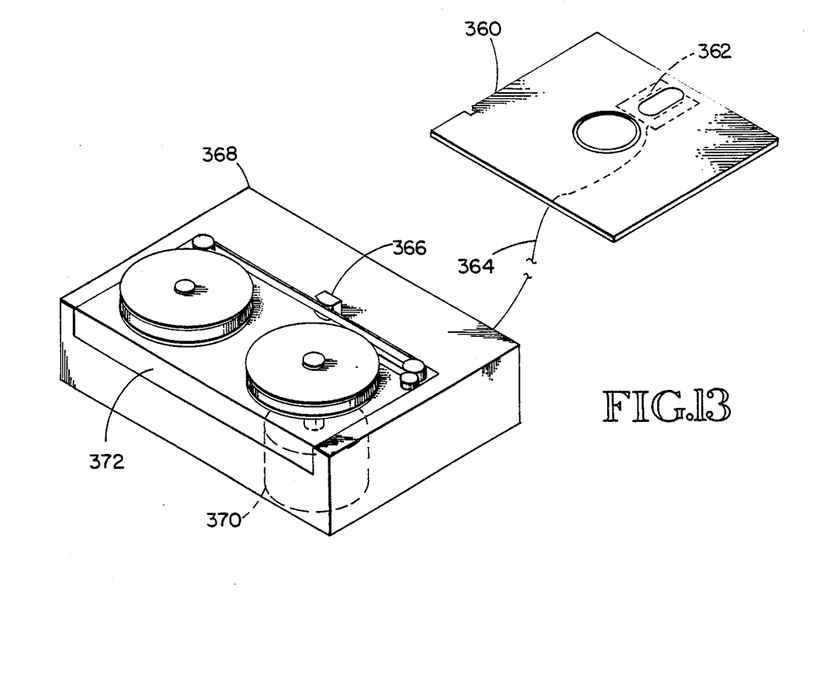
FIG. 13 is an isometric view of a further embodiment of the present invention.

FIG. 13 is an isometric view of yet another embodiment of the present invention. In this embodiment, lip portion 360, which is shaped very much like a floppy disk, can be inserted into a disk drive unit. Circuit 362 can then interact with the read/write head of the disk drive unit. The signals received by circuit 362 are transmitted over wire 364 to a tape recording device having a conventional read/write head, for example, the read/write head 366 of tape recorder 368. An electric motor 370 causes the tape cartridge 372 to move past the head of tape recorder 368. Data received from circuit 362 over wire 364 can be recorded on tape cartridge 372. Data read from tape cartridge 372 can be transmitted over wire 364 to circuit 362, which interacts with the read/write head of the disk drive unit to cause information to be passed to the host computer system.

Figure 14:
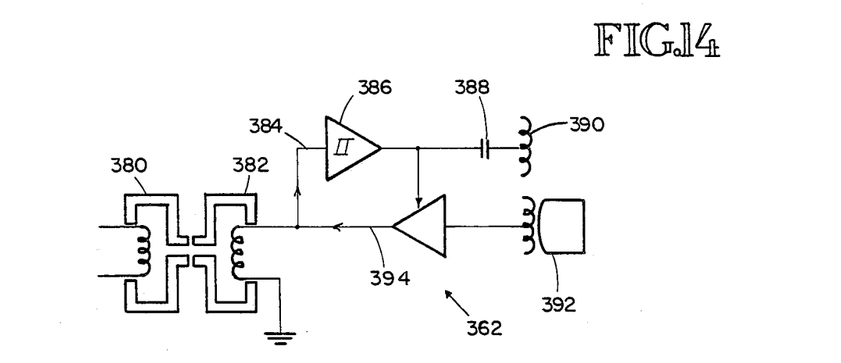
FIG. 14 is a schematic diagram of the data transfer means of the embodiment shown in FIG. 13.

FIG. 14 is a schematic diagram of the electronic circuitry of circuit 362 in FIG. 13. Disk drive read/write head 380 interacts magnetically with translator head 382 and generates a WRITE signal on line 384. This signal passes through one-shot device 386 and, possibly, through coupling capacitor 388 to the write/erase winding 390 in tape head 366 of tape recorder 368 (see FIG. 13). When writing data from the tape cartridge 372 (see FIG. 13), tape head 366 interacts magnetically with the tape in tape cartridge 372 and leads to amplified signals on line 394. These signals then pass to translator head 382, which then interacts magnetically with the read/write head 380 in the disk drive unit.

Figure 15:
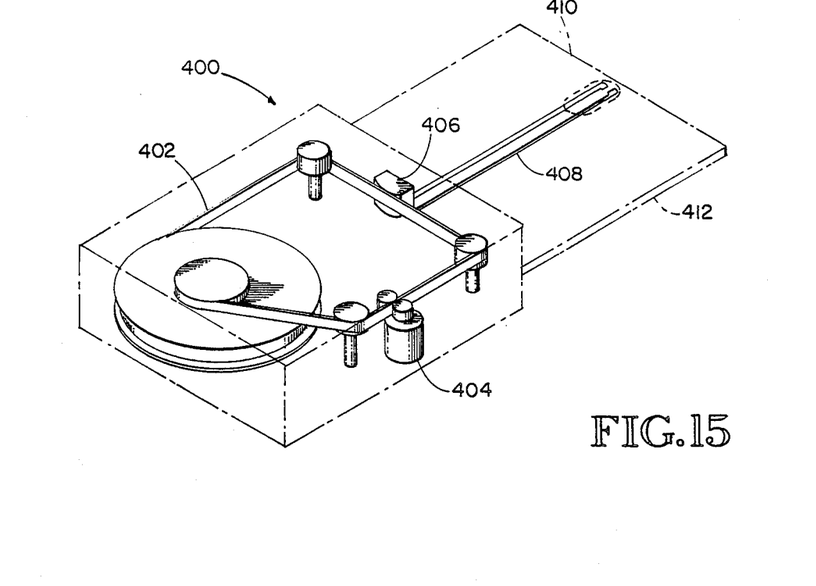
FIG. 15 is an isometric view of another embodiment of the present invention.
Figure 16:
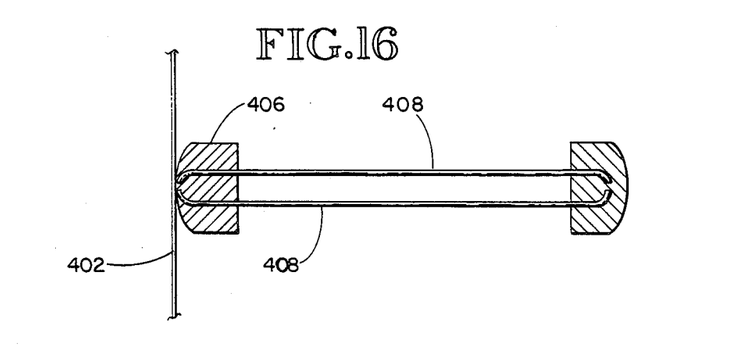
FIG. 16 is a closeup view of the magnetic circuit of the embodiment of the tape backup device shown in FIG. 15.

FIG. 15 is an isometric phantom view of yet another embodiment of the present invention. Tape backup device 400 contains a tape loop 402, such as from an endless tape reel, and an electric motor 404 that is mechanically linked to the tape to cause it to move past tape head 406. Motor 404 can be connected to a power supply as described above in connection with other embodiments. As can be seen in the closeup of FIG. 16, tape head 406 interacts, by means of magnetic flux, with tape loop 402. Tape head 406 is part of a magnetic circuit that includes non-touching soft iron pieces 408 which extend toward edge 410 of lip portion 412 (see FIG. 15). Changes in magnetic flux that are detected by tape head 406 are therefore magnetically transmitted through soft iron pieces 408 to the proximity of the read/write head of the disk drive unit. This magnetic signal is received by the read/write head of the disk drive unit and then passed on to the associated personal computer. In the other direction, signals from the personal computer can be sent to the read/write head of the disk drive unit and received by soft iron pieces 408 for transmittal to tape head 406. The resulting magnetic flux is passed to tape loop 402 which moves past tape head 406 to record the signals emanating from the read/write disk drive head.

In each of the embodiments discussed above, one of two possible tape transport mechanisms is used. In the case of reel-to-reel tape mechanisms, a reversing mechanism will cause the tape to move from one reel to the other and then back to the first reel. During each pass of the tape past the disk drive head, the disk drive head writes on a single track along the magnetic tape. When the tape reverses direction, the disk drive head increments and is placed over the location of the next adjacent unwritten track. In this manner, the tracks on the magnetic tape are written upon in a serpentine fashion. Using conventional technology, the tape, which is at least as wide as the aperture through which the disk drive read/write heads gain access to the tape, can contain twenty tracks. Each track can consist of 6,000 sectors and each sector can contain 512 bytes.

In the endless loop configuration, the sectors on a particular track are written sequentially until they have each been filled with data. The disk drive head then moves to an adjacent track and begins to fill this new track with data until all sectors are filled. The endless loop tape is then filled in a spiraling fashion.

Conventionally, the first track of a floppy disk contains a directory and file allocation tables. The directory tells what files are located on the floppy disk and the file allocation table indicates where a particular file might be found on the floppy disk. The same convention can be used in the tape backup device of the present invention. The first track can consist of periodic repetitions of the directory and the file allocation table, regardless of whether the tape is reel-to-reel or endless. In addition to including the directory and file allocation tables on the first track, it is possible that the backup and restore programs that the host personal computer system uses in conjunction with the tape backup device of the present invention can be recorded on the first track. Because the directory, the file allocation table, and possibly the backup and restore programs can be written periodically on the first track, the disk drive unit will be capable of reading these data and programs without using any floppy disk to load in the backup or restoration programs.

Figure 17A:
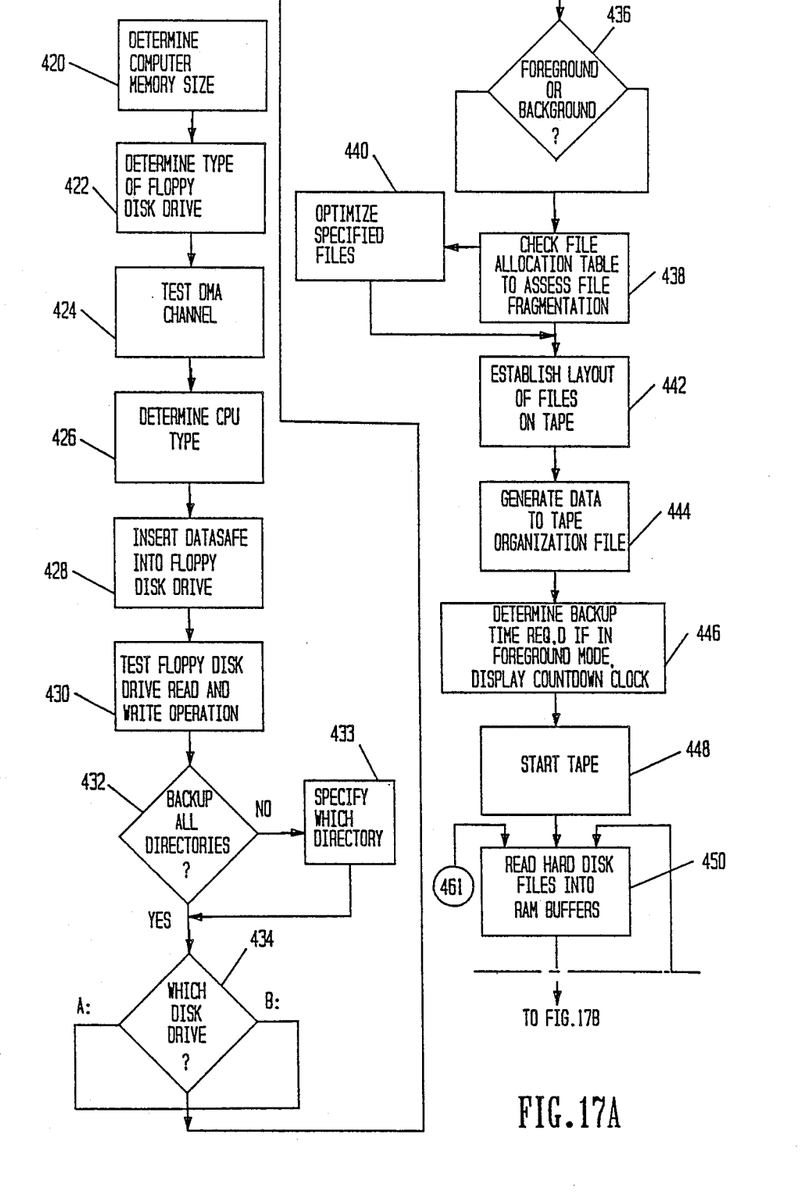
FIGS. 17A and B are a flow chart of the BACKUP program for use with the present tape backup device, the program controlling the tape backup device when backing up data from a host personal computer system.

FIG. 17 is a flow chart of a BACKUP program that can be used with the tape backup device of the present invention. The first step in the BACKUP program, given in block 420, is to determine the size of the host computer's memory. Next, in block 422, the program determines the type of disk drive unit used with the host computer system. Blocks 424 and 426 test the direct memory access channel between the hose computer's memory and the disk drive unit, and determine the type of central processing unit the computer system has. In one embodiment of the software, the user is then prompted to insert the backup data device into the disk drive unit (block 428). In block 430, the disk drive unit is tested to see whether the read and write operations are effective.

Next, in decision block 432, the user is prompted to decide whether to back up all, or only certain, directories. If all directories are to be backed up, control of the program passes to decision block 434. Otherwise, the user is prompted to specify which directories are to be backed up (block 436). Control then passes to decision block 434. Decision block 434 prompts the user to specify which disk drive contains the backup data device. In decision block 436, the user is prompted to decide whether backup should occur with the software working in the foreground or in the background. In block 438, the BACKUP program checks the file allocation table to assess the degree to which the files are fragmented. If they are judged to be too fragmented, the specified files are optimized (block 440). In either case, control next passes to block 442, at which step the layout of the files on the tape is established. In block 444, a disk-to-tape organization file is created, and in block 446, the program determines the time required for the backup operation. If the user has chosen to do the operation in the foreground, the program will cause a countdown clock to be displayed on the computer system display device.

Figure 17B:
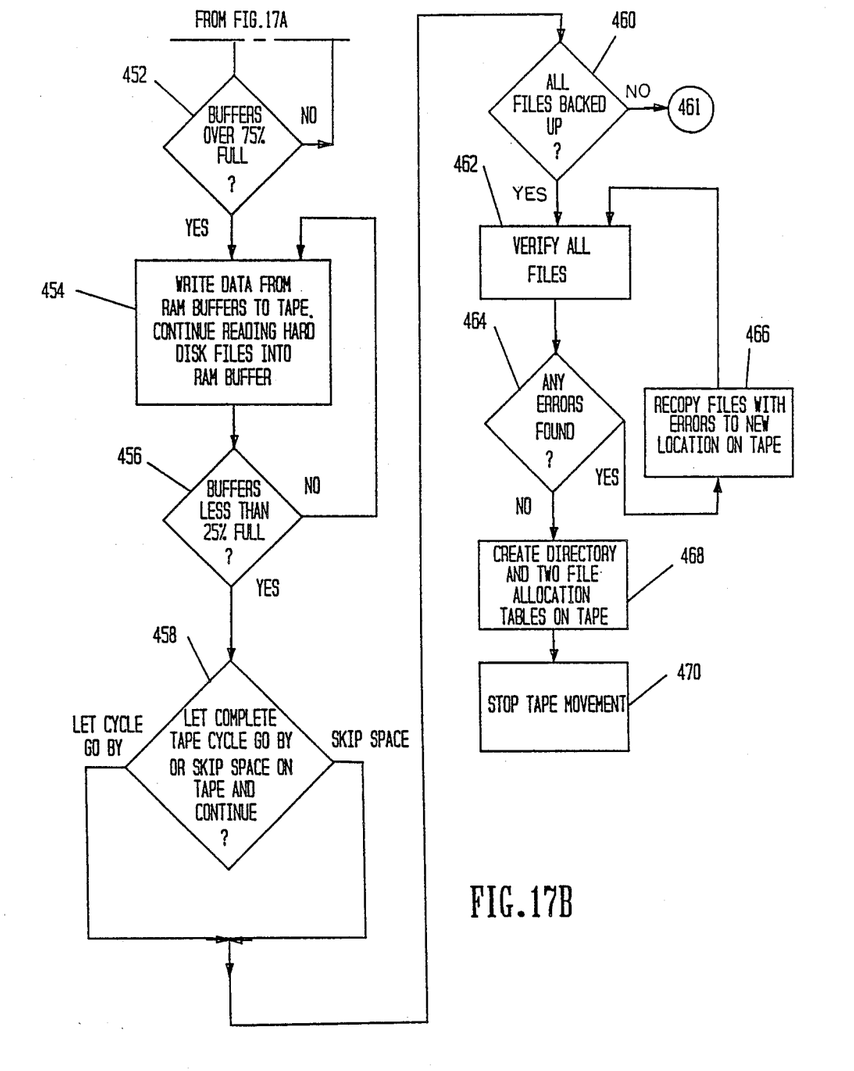

Once the initialization steps have been completed, the tape in the tape backup device is caused to move (block 448) by sending a start signal to the floppy disk drive data from the hard disk files are then read into random access memory (RAM) buffers (step 450) in decision block 452, which forms a decision loop with block 450. Block 452 determines whether the buffers are approximately 75% full. At this point, control passes to block 454, which supervises the writing of the data from the RAM buffers to the tape in the tape backup device. As data are read from the RAM buffers to the tape, data are also being read from the hard disk files to the RAM buffer. Decision block 456 forms a decision loop with block 454. When it is determined that the RAM buffers are less than 25% full, control passes to decision block 458, where the program decides whether to let a complete tape cycle go past the data transfer means, or whether to skip a space on the tape. Next, in decision block 460, it is determined whether all files have been backed up. If they have not, control returns to decision block 450 to read in the next file (along path 461).

If all files have been backed up, control passes to block 462, which signifies a verification of all files backed up. Block 462 forms a decision loop with decision block 464 and block 466. If, in decision block 464, any discrepancies are found between the files recorded on the magnetic tape of the tape backup device and the files on the hard disk, the copy of the file on the magnetic tape is nullified and control of the program is passed to block 466. At this step, the files with errors are recopied to new locations on the magnetic tape. The verification step block 462 is then repeated for the files that have just been recopied. Eventually all files will be verified and decision block 464 will pass control of the program to block 468, which will create the directory and two file allocation tables on the magnetic tape of the tape backup device. As stated above, the directory and file allocation tables can be placed on track 1 of the tape. Once the directory and file allocation tables have been created, the tape movement in the tape backup device is stopped (block 470).

Figure 18:
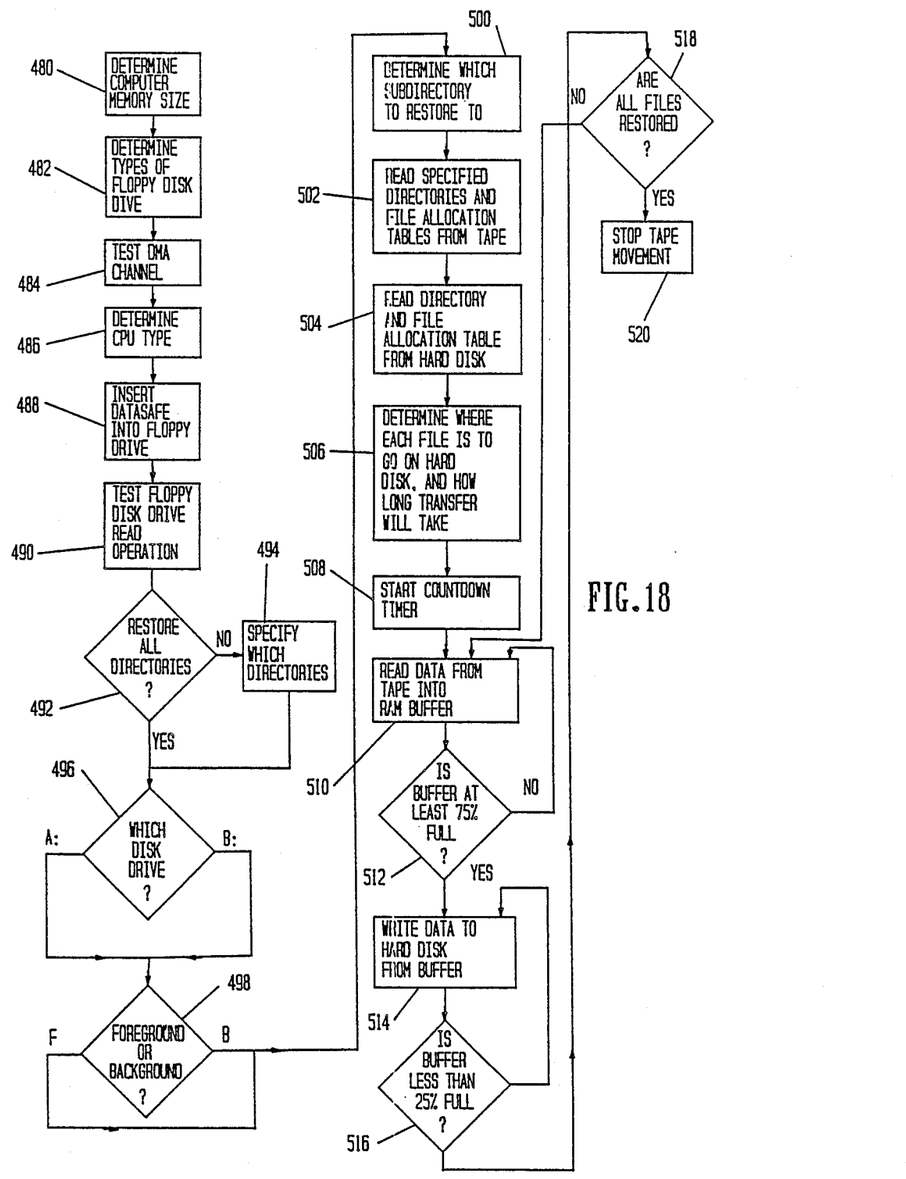
FIG. 18 is a flow chart of a RESTORE program for use with the present tape backup device, the program controlling the tape backup device when restoring data from the magnetic tape to a host personal computer system.

Turning now to FIG. 18, which presents a flow chart for the RESTORE program, it can be appreciated how a control program will bring data which has been recorded on the magnetic tape of the tape backup device back to the hard disk of the host personal computer.

In block 480, the program determines the memory size of the host computer. Next, in block 482, the program determines the type of floppy disk drive used with the personal computer. Block 484 tests for the integrity of the direct memory access channel. Block 486 determines the type of central processing unit used by the host computer. In block 488, the program prompts the user to insert the tape backup device into a floppy disk drive, and in block 490, the disk drive unit's READ operation is tested. After these initialization steps are successfully completed, control passes to the decision loop comprising decision block 492 and block 494. Decision block 492 prompts the user to decide whether all directories are to be restored. If not, control passes to block 494, where the user is prompted for the directories which are to be restored.

Regardless of the answer given in decision block 492, program control eventually passes to decision block 496, which prompts the user to specify which disk drive is to be used. Upon receiving the answer to that question, the program then prompts the user, in block 498, to specify whether the RESTORE program is to be run as a foreground or a background job. Next, control passes to block 500, where the program determines which subdirectory the data shall be restored to, and in block 502, the specified directories and file allocation tables are read from the tape. The next step, given in block 504, is to read the directory and file allocation tables that are stored on the hard disk. In block 506, the program determines where each file to be restored will be placed on the hard disk and determines the length of time the transfer will take.

Given the information obtained in these initialization steps, the program starts a countdown timer (block 508) and begins to read data from the magnetic tape of the tape backup device into the RAM buffer (block 510). As the data are read from the tape into the RAM buffer, the status of the RAM buffer is monitored by the decision loop comprising block 510 and decision block 512. As soon as the RAM buffer is at least is at least 75% full, program control passes to block 514, where the data are written from the RAM buffer to the hard disk. Decision block 516 forms a decision loop with block 514. As the data are read to the hard disk from the RAM buffer, the occupancy of the RAM buffer is determined. When that occupancy falls below 25%, program control passes to decision block 518, where it is determined whether all files have been restored. If they have not, control returns to block 510, where data continue to be read from the tape into the RAM buffer. Once all specified files have been restored, program control passes to block 520 and the tape movement of the tape backup device ends.

While the preferred embodiments of the invention have been illustrated and described, it should be understood that variations of the invention will be apparent to those skilled in the art. Accordingly, the invention is not to be limited to the specific embodiments illustrated and described, and the true scope and spirit of the invention are to be determined by reference to the following claims.

I claim:

1. A tape backup device for receiving data through a disk drive that is adapted to receive a substantially planar magnetic data storage disk in an elongated slot, the disk drive having a drive mechanism for rotating the disk and a magnetic read/write head that is oriented to be adjacent and substantially parallel to a received planar magnetic data storage disk and adapted to transfer data to and from the disk, the backup device comprising:

a housing having integral lip and storage portions, the lip portion having a shape allowing the lip portion to be inserted into the slot of the disk drive, and further having an aperture that is aligned with and parallel to the read/write head of the disk drive when the lip portion is inserted into the disk drive, the storage portion being positioned outside of the disk drive when the housing is inserted into the disk drive and containing a supply of magnetic recording tape, a length of magnetic recording tape from the supply of magnetic recording tape passing into the lip portion from the storage portion and passing adjacent and substantially parallel to the aperture; and a tape drive means including an electric motor contained within the housing for causing the tape from the supply of magnetic recording tape to move adjacent to the aperture and parallel to the read/write head of the disk drive when the lip portion of the housing is inserted into the disk drive.

2. The tape backup device of claim 1 wherein the magnetic recording tape is stored on two independent reels in the storage portion of the housing.

3. The tape backup device of claim 2, further comprising means for reversing the direction of rotation of the tape reels when the supply of tape remaining on one of the tape reels is substantially exhausted.

4. The tape backup device of claim 1 wherein the storage portion of the housing stores the tape in an endless loop.

5. The tape backup device of claim 1, further comprising rotation means adapted to receive the drive mechanism of the disk drive and producing a signal indicative of whether the drive mechanism is operating.

* * * * *